United States Patent
Bharucha

(10) Patent No.: US 10,688,937 B2
(45) Date of Patent: Jun. 23, 2020

(54) LADDER LOCK FOR REAR DEPLOY LADDER RACK

(71) Applicant: PRIME DESIGN, INC., West St. Paul, MN (US)

(72) Inventor: Rashid Bharucha, Roseville, MN (US)

(73) Assignee: PRIME DESIGN, INC., St. Paul, MN (US)

( * ) Notice: Subject to any disclaimer, the term of this patent is extended or adjusted under 35 U.S.C. 154(b) by 0 days.

(21) Appl. No.: 16/155,457

(22) Filed: Oct. 9, 2018

(65) Prior Publication Data
US 2020/0108779 A1   Apr. 9, 2020

(51) Int. Cl.
| B60R 9/04 | (2006.01) |
| B60R 9/048 | (2006.01) |
| B60P 7/135 | (2006.01) |
| B60R 9/042 | (2006.01) |

(52) U.S. Cl.
CPC ............ B60R 9/0485 (2013.01); B60P 7/135 (2013.01); B60R 9/0423 (2013.01)

(58) Field of Classification Search
CPC ......... B60P 3/073; B60P 3/062; B60P 3/1066; B60P 3/40; B60P 3/1033; B60P 3/1075; B60P 3/00; B60P 3/06; B60R 9/00; B60R 9/08
USPC ........ 410/2, 3, 77, 44, 80, 69, 97, 9, 89, 87; 414/800, 470, 494, 803, 679, 533, 23, 414/411; 248/640, 643, 671, 641, 552, 248/499
See application file for complete search history.

(56) References Cited

U.S. PATENT DOCUMENTS

| 3,013,681 | A | * | 12/1961 | Garnett | B60P 3/14 |
| | | | | | 280/4 |
| 6,315,181 | B1 | * | 11/2001 | Bradley | B60R 9/0423 |
| | | | | | 224/310 |
| 7,097,409 | B2 | * | 8/2006 | Richter | B60R 9/0423 |
| | | | | | 182/127 |
| 9,132,780 | B2 | * | 9/2015 | Sautter, Jr. | B60R 9/0423 |
| 9,415,726 | B2 | * | 8/2016 | Levi | B60R 9/0423 |
| 2018/0257578 | A1 | | 9/2018 | Levi | |
| 2018/0345871 | A1 | | 12/2018 | Levi | |

* cited by examiner

*Primary Examiner* — D Glenn Dayoan
*Assistant Examiner* — Sunsurraye Westbrook
(74) *Attorney, Agent, or Firm* — Thomas J. Nikolai; DeWitt LLP

(57) ABSTRACT

A ladder latching device for a rear deploy, tilting type ladder lack that automatically extends and retracts a latch pin as ladders are loaded onto and removed from the roof of a work vehicle. The latching device has an L-shaped lever with a spring biased first leg supporting a latch pin and a second leg with a roller for cooperating with a rail of the rack's stationary bed. The latch pin is made to extend through apertures in a stop post and over a rung of the ladder to trap it only when the roller remains in contact with the stationary rail. During tilting of the load support member, the latch pin retracts.

6 Claims, 8 Drawing Sheets

LADDER LOCK FOR REAR DEPLOY LADDER RACK

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to the field of ladder racks for work vehicles and more particularly to an automatic ladder latching or locking arrangement for preventing the unwanted movement of ladders being transported on a vehicle equipped with a rear deploy, tiltable, ladder rack.

On Mar. 13, 2018, application Ser. No. 15/919,749 was filed describing in full detail the construction and mode of operation of a ladder rack invented by Avraham Y Levi and assigned to ROM Acquisition Corporation, the contents of which are hereby incorporated by reference as if fully set forth herein. Described therein is a ladder rack assembly for a work vehicle that has a stationary bed for attachment to the roof of the vehicle and extending along its length dimension. The stationary bed comprises a pair of parallel, spaced-apart rails that has guides thereon that extend from the rails' first ends toward, but short of, their second ends. Rollers on side edges of a load support member ride on the bed rails. When the rollers are constrained by the guides, only translation of the load support member can take place. Upon exit of the rollers from the rear ends of the guides, both translation and rotation of the load support member can occur. A control arm is pivotally joined at one end to the stationary bed. The free end of the control arm includes cam actuated latch pin assemblies that coact with cam surfaces on the stationary bed during rearward displacement of the load support member to latch the load support member to the control arm whereby further rearward movement of the load support member forces it to rotate from a horizontal disposition and ultimately tilt to an inclined disposition at the rear of the work vehicle.

A load, such as one or more extension ladders or step ladders, may be secured to the load support member and elevated onto the roof of the work vehicle by lifting a rear end of the load support member while simultaneously pushing it in a forward direction. In doing so, the control arm will cause the load support member to rotate from its inclined disposition at the rear of the vehicle to a horizontal disposition as the load support member is advanced in the forward direction.

On Aug. 10, 2018, a continuation-in-part of the afore-referenced application was filed as application Ser. No. 16/101,053. It discloses an alternative device for coupling and uncoupling the control arm of the rear deploy ladder rack to its load support member. It further supplements its parent application with an explanation of how the power unit is attached to the ladder rack's stationary bed so that a flight of the power unit's chain remains aligned with the underside of the load support member during rotation of the load support member.

Not disclosed in either of the afore-referenced applications are means for latching the ladders to the load support member to thereby inhibit the load carried on the load support member to move during transit, especially during sudden acceleration or braking. It is the purpose of the present invention to provide such a latching mechanism to inhibit shifting of the load during transit.

SUMMARY OF THE INVENTION

In accordance with the present invention, a ladder latching device for a rear deployed, tilting vehicle ladder rack includes a stop member in the form of a post which is fixedly attached to the load support member of the tilting ladder rack proximate the front end thereof so as to project perpendicularly outward from the top surface of the load support member. A generally L-shaped lever is pivotally joined to the stop member near the attachment point of the stop member to the load support member. A first leg of the L-shaped lever having first and second ends has a roller journalled at the first end and the second end is attached as a second leg of the L-shaped lever. A latch pin is affixed to the second leg of the L-shaped lever proximate its upper end and the latch pin is aligned with an aperture formed through the post comprising the stop member. A compression spring is operatively disposed between the stop post member and the second leg of the L-shaped lever for normally urging the L-shaped lever to a latch pin retracted position relative to the aperture in the stop post member.

The arrangement is such that movement of the first leg in a first direction actuates the L-shaped lever to effect extension of the ladder latch pin out through the apertures of the stop member. Furthermore, the roller and the first leg are adapted to cooperate with the stationary bed of the rear deploy ladder rack during displacement of the load support member with respect to the stationary bed.

In use, a ladder will be placed against the load support member and manually pushed until one of its rungs near the ladder's upper end comes to rest against the stop member. Now, as the load support member and ladder are made to assume a generally horizontal disposition atop the work vehicle's roof, the roller on the first leg of the L-shaped lever will drop into contact with the rail of the stationary bed to rotate the L-shaped lever about its pivot joint causing the latch pin to extend out from the stop member's post and overlay the ladder rung, thereby capturing the ladder.

During an unloading operation, as soon as the roller on the pivot arm begins to rise off from being in contact with the rail of the stationary bed, the compression spring will force the L-shaped lever in a direction such that the latch pin affixed to it retracts back through the aperture in the stop post member so that the ladder rung is no longer captured. Now a workman can lift the ladder free of the ladder rack and carry it to his or her worksite.

BRIEF DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
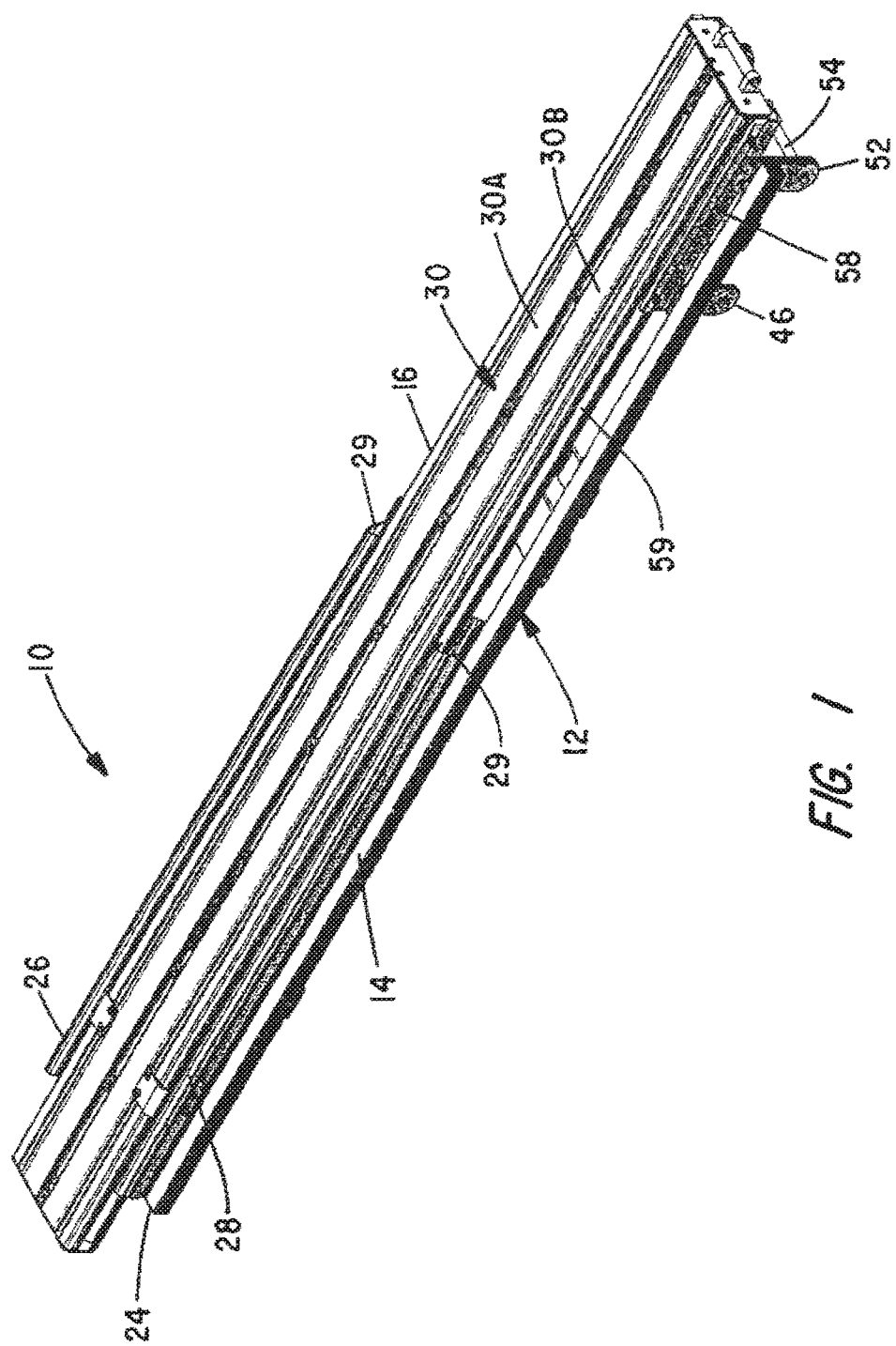
FIG. 1 is a perspective view of a rear deploy, tilting ladder rack in its ladder transport position without the ladder latching device of the present invention attached.

This invention is being described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached', "attaching", "join" and "joining" are used interchangeably and refer to one structure or surface being secured to another structure or surface or integrally fabricated in one piece, unless expressively described otherwise.

Referring first to FIG. 1, there is shown a perspective view of a rear deploy, tilting ladder rack in which a latching mechanism of the present invention is to be used. It is shown for reference purposes and as it would be seen when disposed on the roof of a van or other type of work vehicle when in its transport position. It is seen to comprise a stationary bed assembly 12 that includes a pair of side rails 14 and 16 which are held in parallel, spaced-apart relation by a plurality of flat metal plates as at 18, 20 and 22 in FIG. 2. The side rails 14 and 16 are preferably aluminum tubing of rectangular cross-section and, without limitation, may be about 100 inches in length for an embodiment where the assembly is to be aligned with a longitudinal direction of the vehicle.

Extending approximately half way along the length of the side rails 14 and 16 from a front end 24 of the stationary bed 12 are metal guides 26 and 28 of a generally C-shaped cross-sectional contour. The rear ends of the metal guides are identified by numeral 29 in FIG. 1.

Figure 2:
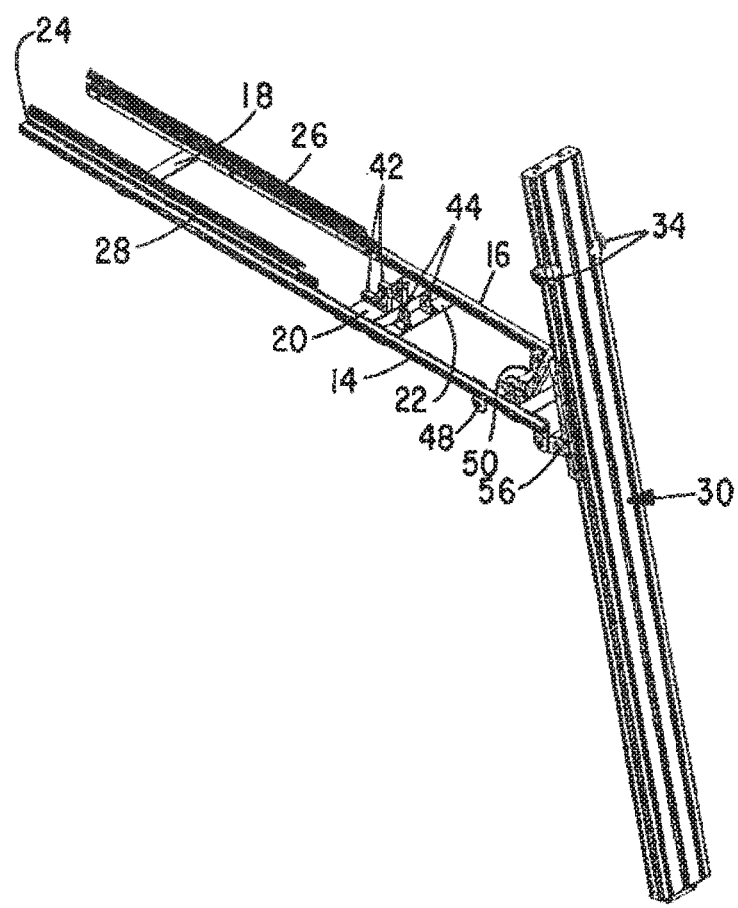
FIG. 2 is a perspective view of the rear deploy, tilting ladder rack in its loading/unloading position, again without the ladder latching device of the present invention attached.

Positioned atop the stationary bed assembly 12 is a load support member indicated generally by numeral 30. It comprises a pair of identical aluminum extrusions 30A and 30B held together in side-by-side relation by screw clamps. Attached to the exposed side edges of the load support member 30 are guide rollers 34 (FIG. 2). The guide rollers cooperate with the roller guides 26 and 28 to constrain the load support member 30 to generally horizontal travel over the length of the roller guides 26 and 28.

With reference to FIG. 2, affixed to and projecting upwardly from the metal plates 20 and 22 are camming surfaces 42 and 44.

Extending between brackets 46 that are affixed to the side rails 14 and 16 of the stationary bed assembly 12 is an axle member 48 having a control arm 50 thereon. Also affixed to the side rails 14 and 16 of the stationary bed assembly 12 are brackets 52 supporting an axle 54 on which a carriage support arm 56 is rotatably secured. The carriage support arm is bolted to a carriage side plate 58 having rollers that ride in longitudinally extending channels 59 formed in the side edges of the extrusions 30A and 30B of the load support member 30.

As is more fully explained in the afore-referenced application Ser. No. 15/919,749, filed Mar. 13, 2018, as a load support member 30 is shifted to the right in FIG. 1 along the stationary bed assembly 12, a point is reached in which the rollers 34 will no longer be constrained by the C-shaped guide members 26 and 28 and at which point the control arm 50 becomes latched to the load support member 30 such that further rearward movement of the load support member causes it to tilt about the axle 54 up from the stationary bed 12 and ultimately come to rest in a somewhat vertical disposition at the rear of the vehicle as seen in FIG. 2.

Figure 3:
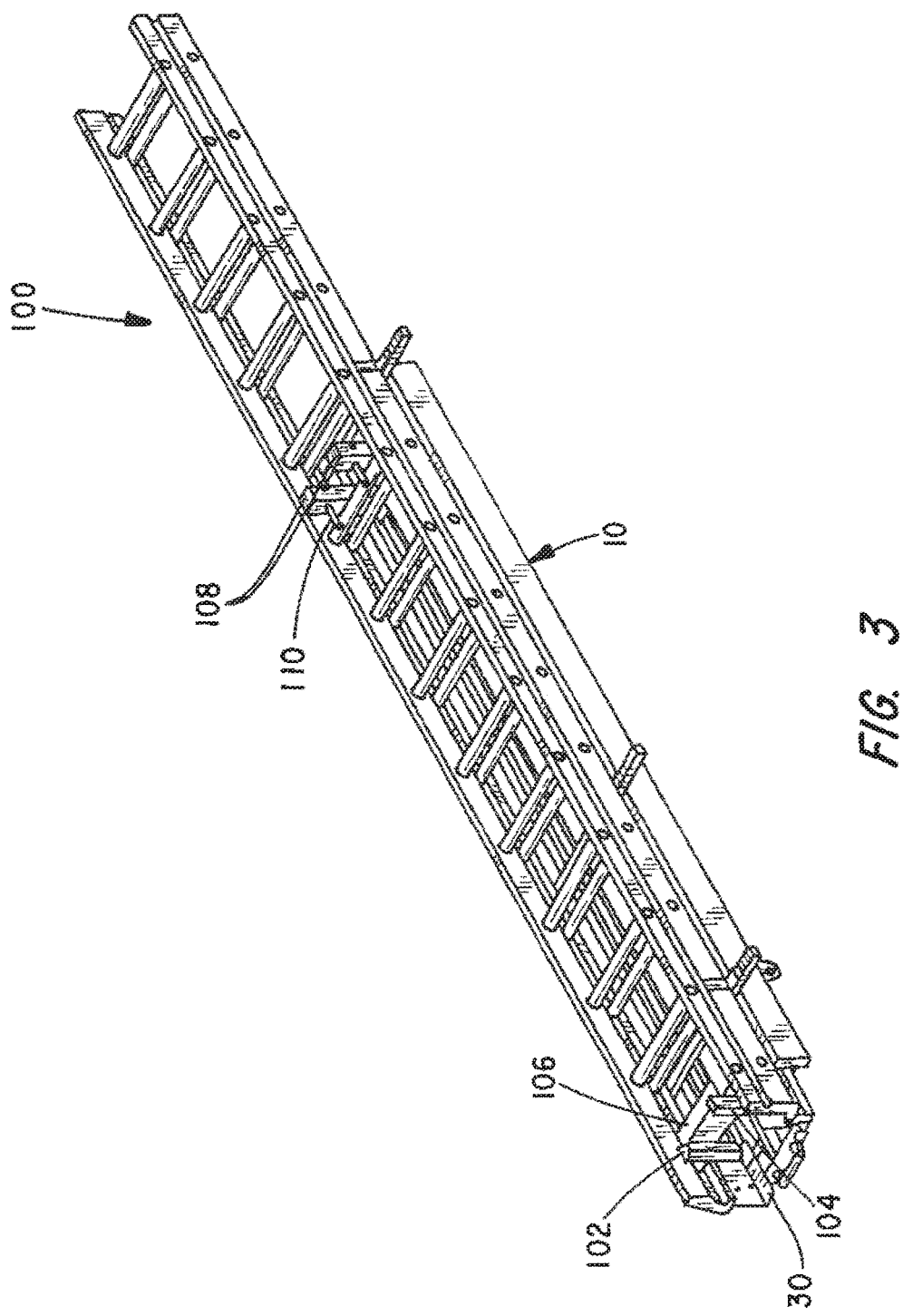
FIG. 3 is a perspective view of the rear deploy, tilting ladder rack with the latching device of the present invention in place and with the ladder rack in its transport (horizontal) position.

Referring now to FIG. 3, it shows the rear deploy, tilting ladder rack 10 as it would appear atop the roof of a work vehicle when transporting an extension ladder 100. To prevent the ladder from shifting longitudinally due to acceleration or braking of the vehicle there is attached near the rear or lower end of the load support member 30 a stop assembly comprising a pair of posts 102 and 104 that extend normal to the top surface of the load support member. Spanning the space between the posts 102 and 104 is a C-shaped bracket 106 which is designed to cradle the ladder's lower rung.

Figure 4:
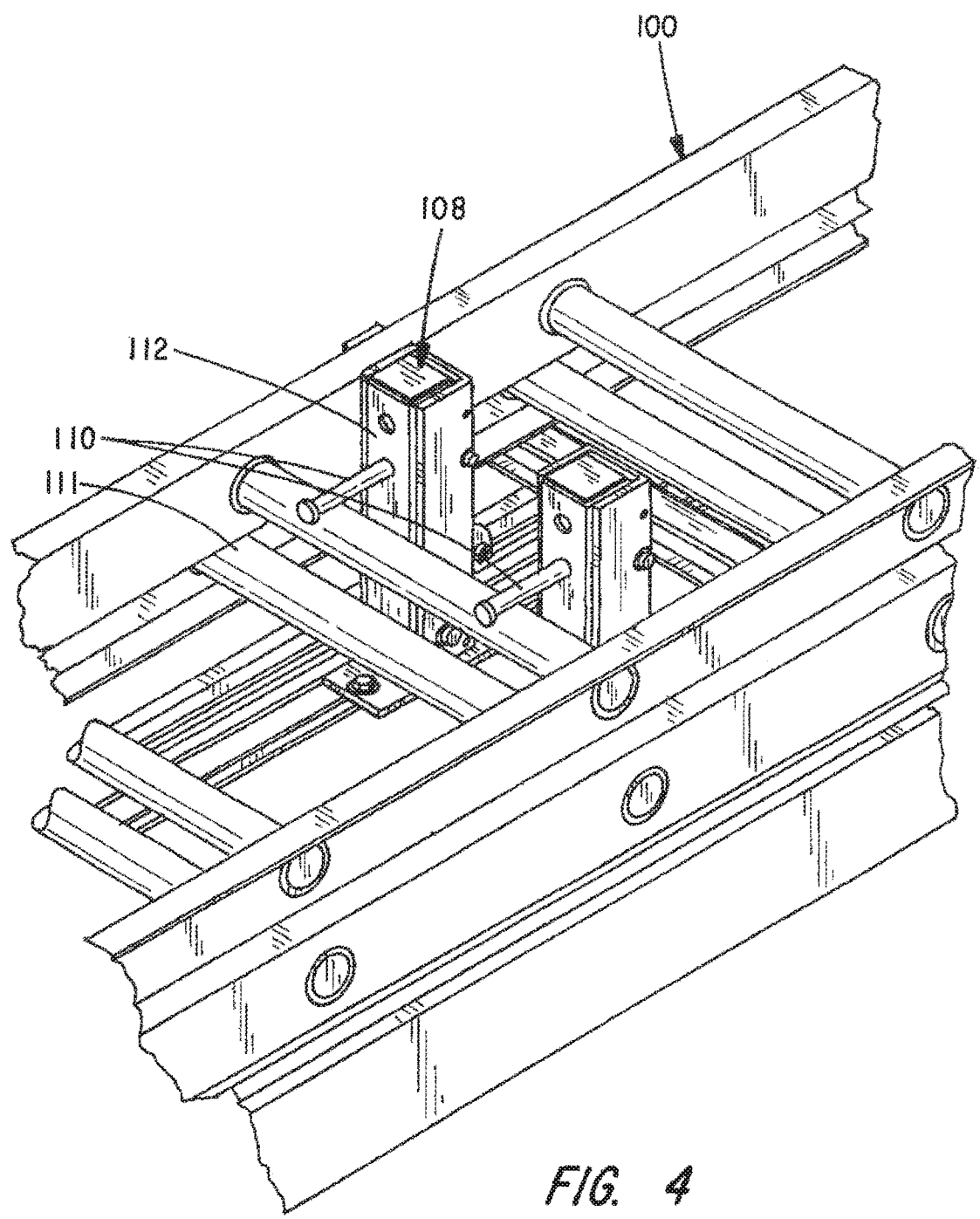
FIG. 4 is an enlarged, partial view showing the latching mechanism deployed to retain ladders as they are being transported.

Disposed proximate the front end of the load support member 30 are a pair of latch devices that comprise the preferred embodiment of the present invention. They are identified generally in FIGS. 3 and 4 by reference numeral 108. Projecting out from the latch devices 108 are extendable and retractable latch pins 110 which overlay the ladder rung 111 when extended (FIG. 4). Thus, by cooperating with the stop posts 112 with latch pins 110 positioned over a ladder rung 111 near the forward end of the load support member 30 and the bracket 106 at a bottom rung, the latching devices of the present invention securely capture the ladder and prevent its ability to shift or bounce upward in riding atop a vehicle.

Figure 5:
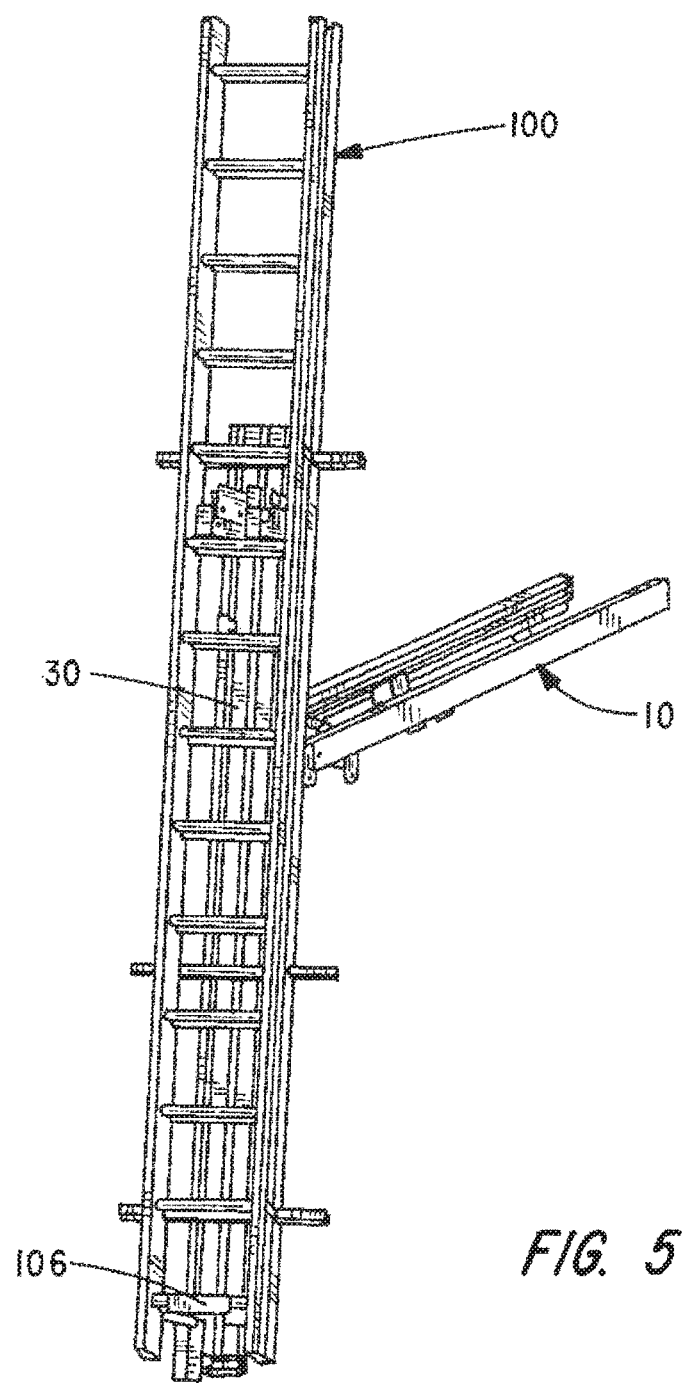
FIG. 5 is a perspective view of the rear deploy, tilting ladder rack with a ladder thereon ready to be loaded onto or as positioned for unloading from a vehicle.
Figure 6:
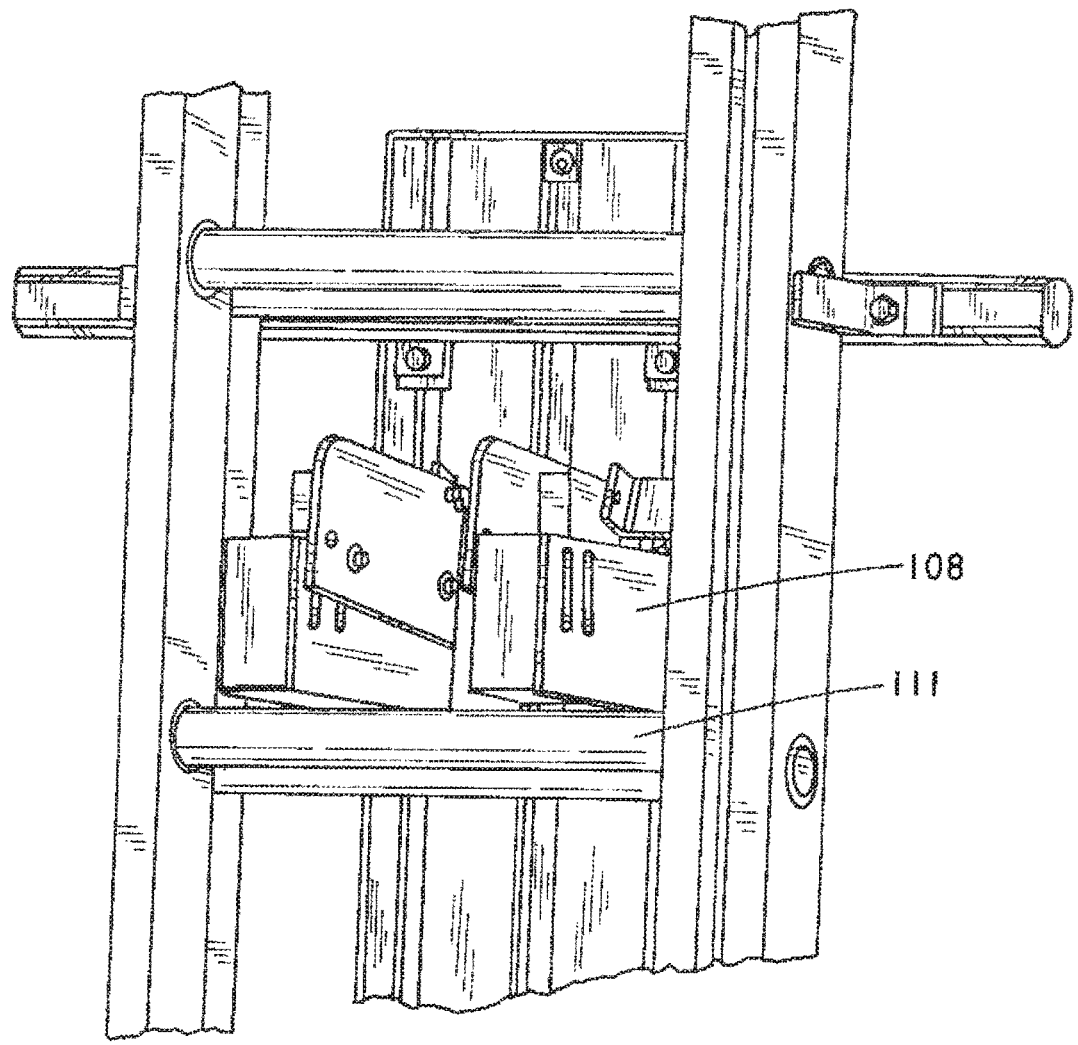
FIG. 6 is an enlarged partial view of FIG. 5 showing the ladder latching device with the ladder in its loading/unloading condition.

When loading or unloading a ladder from the roof of the work vehicle, the load support member 30 will be at the rear of the vehicle and somewhat inclined with respect to the vertical as shown in FIG. 5. The lower rung of the ladder 100 will remain cradled in the C-shaped bracket 106, but the latch pins 110 of the ladder latch devices 108 will be retracted and will no longer be overlaying the ladder rung 111 as seen in the detailed view of FIG. 6. As such, when removing a ladder it is only necessary to rotate it to a vertical disposition in the cradle bracket 106 away from the load support member 30 and to lift the ladder so that its lower rung will clear the C-shaped cradle bracket 106.

Next, with reference to FIGS. 7-9, it will be explained how the latch pins 110 are made to automatically extend and retract relative to an adjacent ladder rung that is made to abut the stop posts 112. Each of the pair of ladder latching devices 108 comprises a stop post 112 that is fixedly attached to the load support member 30 by means of a T-bolt 114 passing through a base plate 115 of the stop post 112 and into a T-slot on the extrusions comprising the load support member 30. Pivotally joined to stop post 112 is an L-shaped lever 116, one leg of which 118 is C-shaped in cross-section and designed to fit about the square contour of stop post 112. The leg 118 is made to pivot with respect to the post 112 by a pivot bolt identified by numeral 120 that extends through aligned holes in the leg 118 and the stop post 112. The second leg of the L-shaped lever 116 is identified by numeral 122 and includes a roller 124 at a free end thereof.

Figure 8:
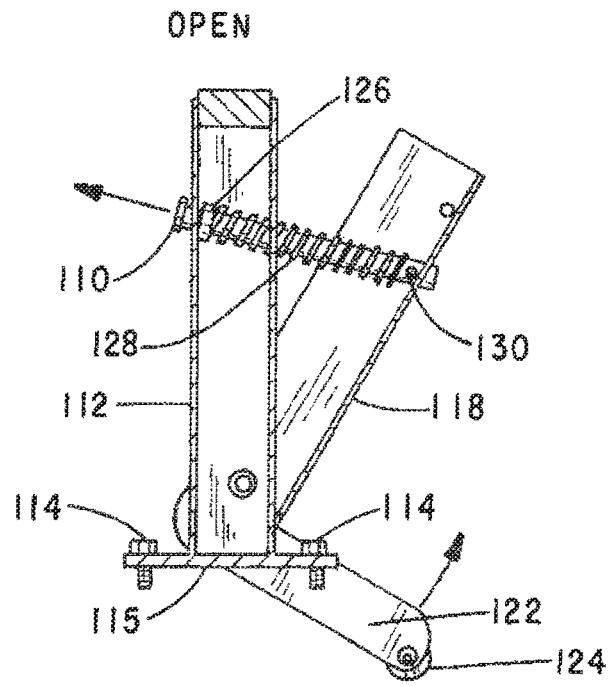
FIG. 8 is a cross-sectioned side view of the latching device showing its internal construction when in its ladder loading/unloading (unlatched) position.

Turning next to FIG. 8, there can be seen that aligned apertures are formed through the stop past 112 allowing the latch pin 110 to extend therethrough. Surrounding the latch pin is a washer 126 and a coil compression spring 128. The distal end of the latch pin 110 is held in place in an aperture formed through leg 118 by a key 130 and the key is acted upon by the force of the coil spring 128.

Figure 7:
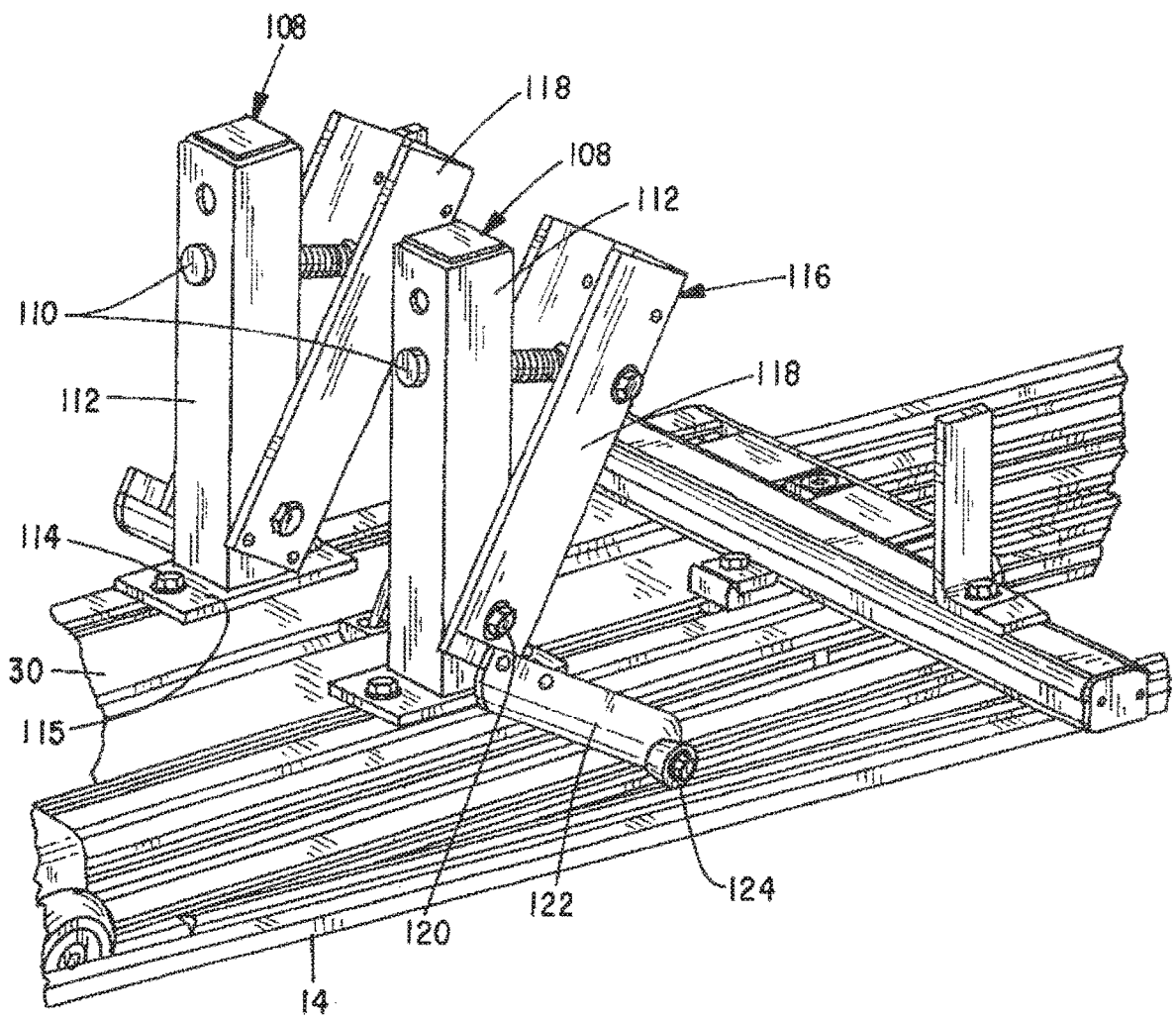
FIG. 7 is a partial perspective view of the ladder latching device mounted onto the load support member of a rear deploy, tilting ladder rack with the latching device in its ladder release position.
Figure 9:
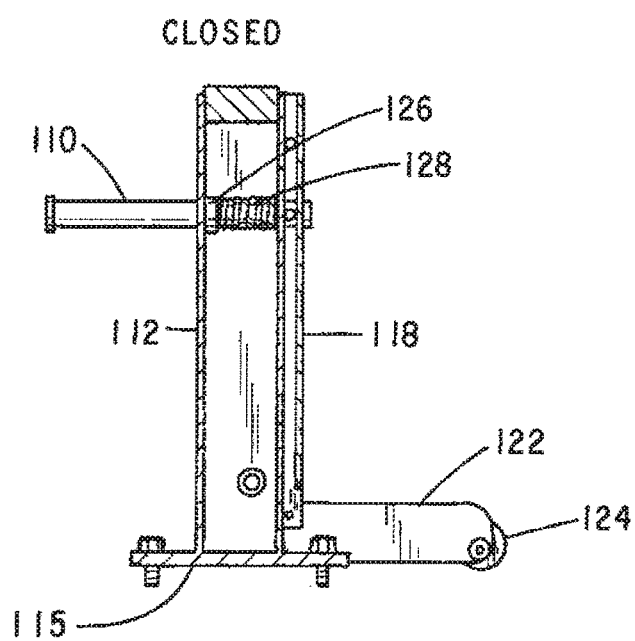
FIG. 9 is cross-sectioned side view of the latching device showing its internal construction when in its ladder transport (latched) position.

As is seen in FIG. 7, the roller 124 on the leg 122 is adapted to engage one of the rails 14 or 16 of the stationary base 12 and when in contact therewith the L-shaped lever arm 118 will be rotated to the position shown in FIG. 9 such that the latch pin 110 will project out over an adjacent rung 111 of the ladder that is made to contact the stop post 112. However, when the load support member 30 begins to lift or tilt relative to the stationary base, the roller 124 will be lifted out of contact with the stationary base rail, allowing the compression spring 128 to expand against the leg 118 thereby retracting the latch pin 110 to the position shown in FIG. 8 so that the latch pin will no longer overlay the ladder rung. At this point, the force of gravity holds the ladder against the load support member. Of course, this only occurs during loading or unloading of the ladder and not during the time that the ladder is being transported atop the roof of a work vehicle. When being transported, the roller 124 is constantly engaged with the rail of the stationary bed keeping the spring 128 compressed and the latch pins extended.

Obviously, numerous modifications and variations of the present invention are possible in light of the above teachings. It is therefore to be understood that within the scope of the appended claims, the invention may be practiced otherwise than as specifically described herein.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A ladder latching device for a rear-deploy vehicle ladder rack comprising:
   a) a stop member adapted to be fixedly attached to a load support member of a rear deploy vehicle ladder rack so as to project outward from a top surface of the load support member, said stop member including an aperture formed therethrough;
   b) AN L-shaped lever pivotally joined to the stop member, said L-shaped lever having first and second legs;
   c) the first leg having first and second ends with a roller at the first end, the first leg being attached to the second leg at the second end;
   d) a ladder latch pin affixed to the L-shaped lever and extendable and retractable through said aperture in the stop member; and
   e) a compression spring disposed between the stop member and the second leg of the L-shaped lever for normally urging the L-shaped lever to a latch pin retracted position relative to the aperture.

2. The ladder latching device of claim 1 wherein movement of the first leg in a first direction actuates the L-shaped lever to effect extension of the ladder latch pin through the aperture.

3. The ladder latching device of claim 2 wherein the roller is adapted to cooperate with a stationary bed of the rear-deploy vehicle ladder rack during displacement of the load support member with respect to the stationary bed.

4. The ladder latching device of claim 3 wherein the compression spring rotates the L-shaped lever to retract the ladder latch pin with respect to the aperture when the roller is lifted out of contact of the stationary bed.

5. The ladder latching device of claim 1 wherein the stop member comprises a length of tubing of a rectangular cross-section and the L-shaped lever has the second leg thereof of a C-shaped cross-section for partially surrounding the stop member when the ladder latch pin is extended with respect to the aperture.

6. The ladder latching device of claim 1 wherein the compression spring is a coil spring disposed in surrounding relation on the ladder latch pin.

* * * * *